United States Patent
Hainz

(10) Patent No.: US 10,634,519 B2
(45) Date of Patent: Apr. 28, 2020

(54) MAGNETIC SENSOR FOR SYSTEM-LEVEL DIAGNOSTICS

(71) Applicant: Infineon Technologies AG, Neubiberg (DE)

(72) Inventor: Simon Hainz, Villach (AT)

(73) Assignee: Infineon Technologies AG, Neubiberg (DE)

( * ) Notice: Subject to any disclaimer, the term of this patent is extended or adjusted under 35 U.S.C. 154(b) by 303 days.

(21) Appl. No.: 15/698,266

(22) Filed: Sep. 7, 2017

(65) Prior Publication Data

US 2019/0072416 A1 Mar. 7, 2019

(51) Int. Cl.
*G01D 5/244* (2006.01)
(52) U.S. Cl.
CPC ............... *G01D 5/24457* (2013.01)
(58) Field of Classification Search
CPC .......................... G01D 5/12–5/24457
See application file for complete search history.

(56) References Cited

U.S. PATENT DOCUMENTS

| | | | |
|---|---|---|---|
| 9,329,057 B2 | 5/2016 | Foletto et al. | |
| 2009/0001965 A1 | 1/2009 | Ausserlechner et al. | |
| 2013/0335067 A1* | 12/2013 | Dwyer | G01D 3/08 324/207.11 |
| 2015/0145504 A1 | 5/2015 | Bai et al. | |
| 2016/0004585 A1* | 1/2016 | Slama | G06F 11/0745 714/57 |
| 2016/0108842 A1* | 4/2016 | Mirassou | F02D 41/0097 73/1.41 |

OTHER PUBLICATIONS

Ditex, "Anti-Lock Braking System (ABS)", Auto DITEX BG Ltd. 2016, 6 pages.

* cited by examiner

*Primary Examiner* — Daniel R Miller
(74) *Attorney, Agent, or Firm* — Harrity & Harrity, LLP

(57) ABSTRACT

A magnetic sensor may include one or more sensor components to detect a system-level error, associated with a sensor system that includes the magnetic sensor, based on a set of signal characteristics of a waveform corresponding to a magnetic field present at the magnetic sensor. The one or more sensor components may provide an indication of the system-level error in an output signal.

20 Claims, 11 Drawing Sheets

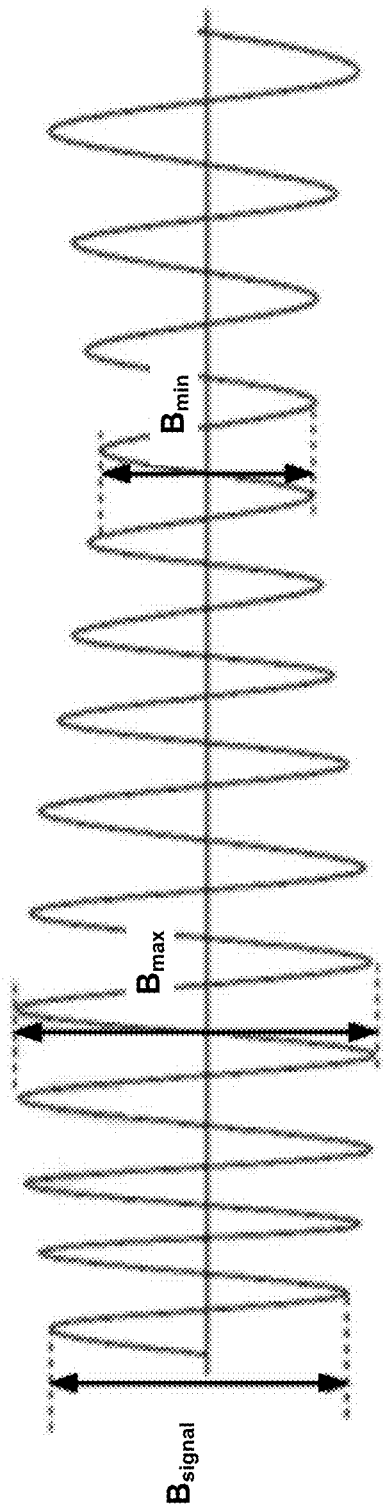
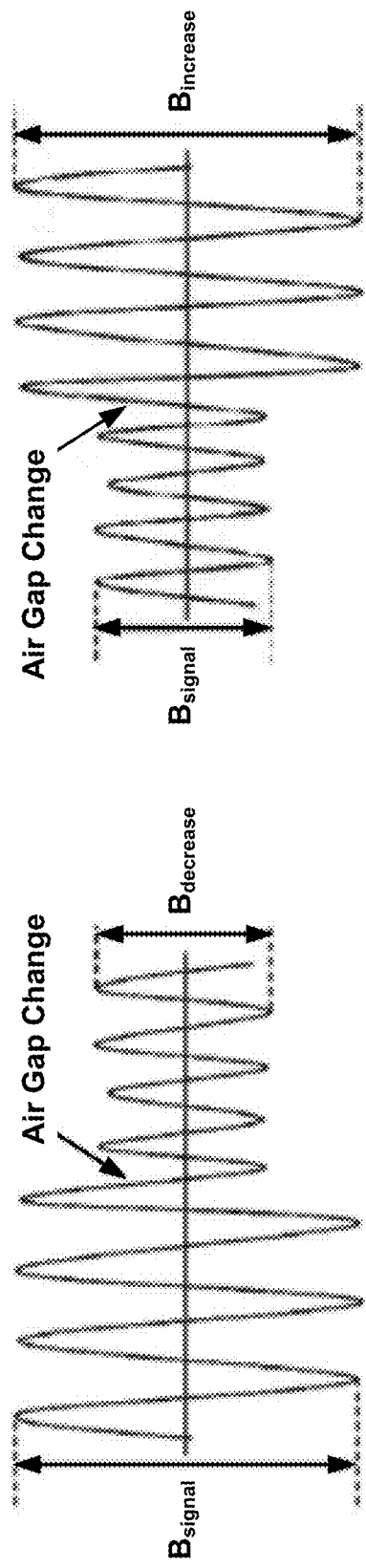
FIG. 5A
FIG. 5B
FIG. 5C

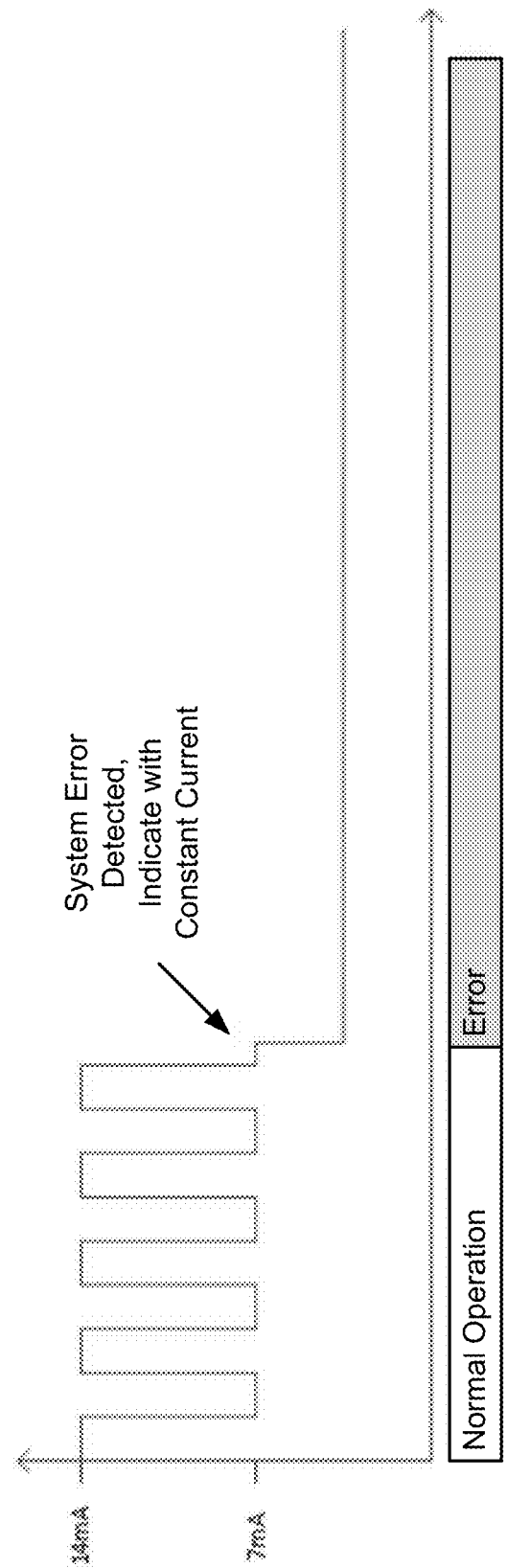

MAGNETIC SENSOR FOR SYSTEM-LEVEL DIAGNOSTICS

BACKGROUND

A magnetic sensor may sense a magnetic field produced or distorted by a rotating magnet wheel, such as a tooth wheel, an encoder wheel, and/or the like. The magnetic sensor may output, based on the sensed magnetic field, a signal for use in identifying a rotational direction of the magnet wheel, a rotational speed of the magnet wheel, a rotational angle of the magnet wheel, and/or the like.

SUMMARY

According to some possible implementations, a magnetic sensor may include one or more sensor components to: detect a system-level error, associated with a sensor system that includes the magnetic sensor, based on a set of signal characteristics of a waveform corresponding to a magnetic field present at the magnetic sensor; and provide an indication of the system-level error in an output signal.

According to some possible implementations, a sensor may include one or more sensor components to: determine, based on a magnetic field present at the sensor, one or more signal characteristics of a waveform corresponding to the magnetic field; detect, based on the one or more signal characteristics, a system-level error associated with a magnetic circuit that includes the sensor; and provide an indication associated with the system-level error in an output signal, where the output signal may be associated with carrying information indicating a rotational speed or a rotational direction of a wheel included in the magnetic circuit.

According to some possible implementations, a method may include detecting, by a sensor, a system-level error associated with a sensor system, where the system-level error may be detected based on a set of signal characteristics of a waveform corresponding to a magnetic field; and providing, by the sensor, an indication of the system-level error in an output signal used to carry information associated with a magnet wheel included in the sensor system.

BRIEF DESCRIPTION OF THE DRAWINGS

FIGS. 5A-5D are graphical representations of example waveforms based on which a magnetic sensor may detect a system-level error associated with a sensor system; and FIGS. 6A-6D are graphical representations of examples associated with a system error protocol based on which a magnetic sensor may indicate a system-level error associated with a sensor system.

DETAILED DESCRIPTION

The following detailed description of example implementations refers to the accompanying drawings. The same reference numbers in different drawings may identify the same or similar elements.

A magnetic sensor may provide (e.g., to an electronic control unit (ECU)) a signal indicating information associated with a magnet wheel (e.g., an encoder wheel or a tooth wheel mechanically connected to a rotatable object) based on detecting a magnetic field produced or distorted by the magnet wheel. The information carried by the signal may include, for example, information indicating a rotational direction of the magnet wheel, a rotational speed of the magnet wheel, an angular position of the magnet wheel, and/or the like. A magnetic sensor may be configured with a safety mechanism for detecting an error associated with the magnetic sensor. In such cases, upon detecting an error associated with the magnetic sensor, the magnetic sensor may signal the error to the ECU (e.g., such that the ECU may perform an action associated with resolving and/or mitigating the error).

However, such a magnetic sensor does not detect or signal an error experienced on a system level (e.g., a fault, a failure, or a breakdown associated with a sensor system), such as a runout of the magnet wheel, a change in an air gap distance between the magnetic sensor and the magnet wheel (e.g., due to a failure to properly change gear by a transmission unit), a broken tooth on a tooth wheel, poor magnetization of a backbias magnet, and/or the like. The ECU is unable to detect such a system-level error based on the signal provided by the magnetic sensor since the signal provided by the magnetic sensor does not carry information sufficient for such detection (e.g., since the signal provided by the magnetic sensor carries less information than a waveform corresponding to the magnetic field sensed by the magnetic sensor).

Moreover, while a sensor system that includes two or more magnetic sensors (i.e., a sensor system with redundancy) may be capable of identifying some system-level errors (e.g., when one sensor stops providing signal pulses), such a sensor system may not be capable of identifying a number of other system-level errors, such as runout of the magnet wheel, a broken tooth on a tooth wheel, and/or the like.

Some implementations described herein provide a magnetic sensor capable of detecting a system-level error, associated with a sensor system, and providing (e.g., to an ECU), an indication associated with the system-level error using a system error protocol.

Figure 1:
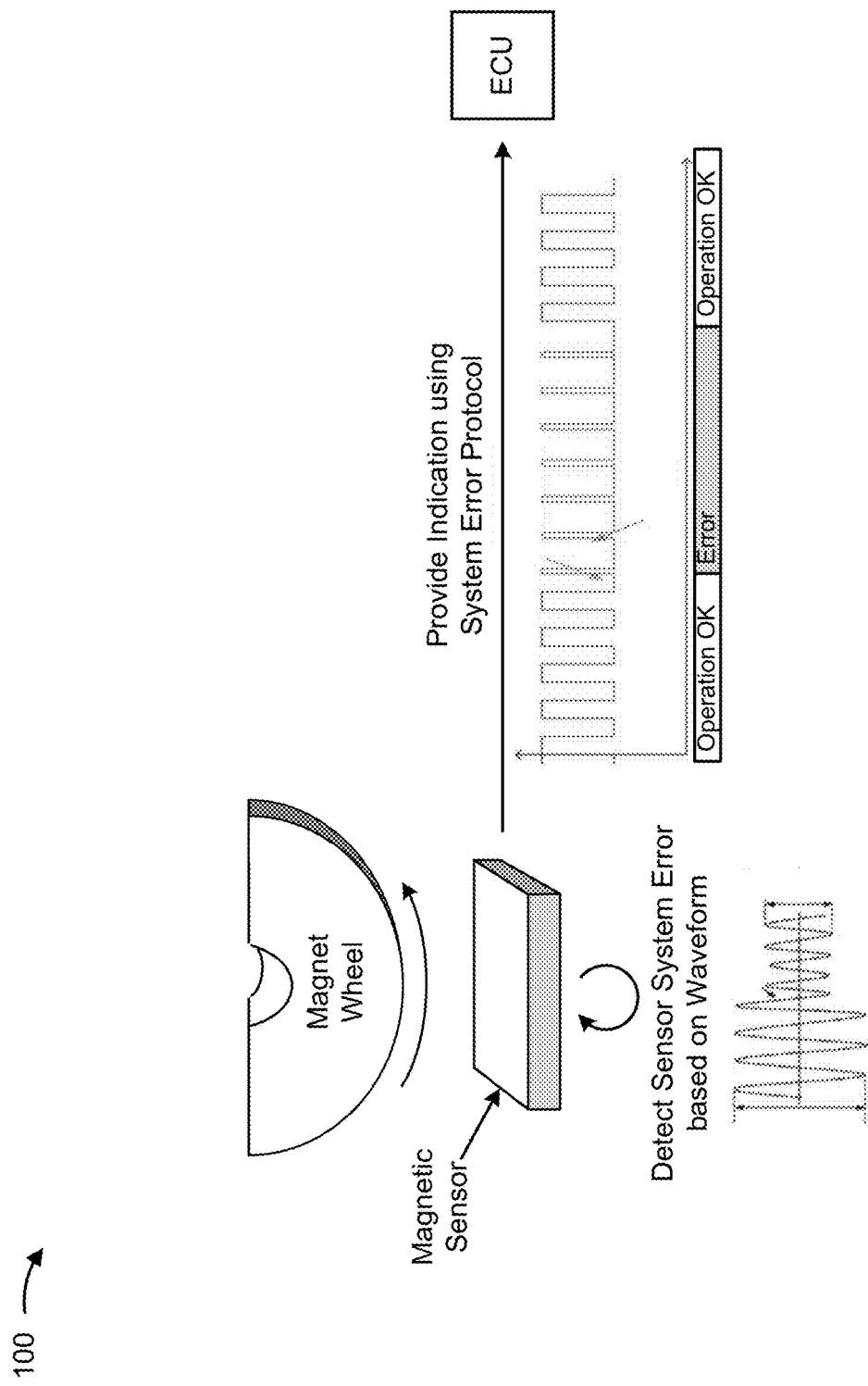
FIG. 1 is a diagram of an overview of an example implementation described herein.

FIG. 1 is a diagram of an overview of an example implementation 100 described herein. As shown in FIG. 1, a magnetic sensor may be arranged to sense a magnetic field, produced or distorted by a magnet wheel (e.g., an encoder wheel, a tooth wheel, and/or the like).

As further shown, the magnetic sensor may detect an error on the system level. For example, as indicated in FIG. 1, the magnetic sensor may detect the error based on a signal characteristic of a waveform corresponding to the magnetic field present at the sensor. For example, the signal characteristic may include extrema (i.e., maximum and/or minimum amplitudes) of the waveform, an offset of the waveform (e.g., an offset from a particular value), and/or the like. Examples of such system-level errors, detectable by the magnetic sensor, include wheel runout, a change in air gap, a broken tooth, poor magnetization of a backbias magnet, and/or the like. Additional details regarding detection of such errors are described below.

As further shown, based on detecting the system-level error, the magnetic sensor may signal the system-level error to an ECU using a system error protocol. For example, the magnetic sensor may signal the system-level error by holding a signal (e.g., a signal used to provide information associated with the magnet wheel, such as a rotational speed, a rotational direction, and/or the like) at a particular signal level (e.g., a constant current level), by providing a pulse of a particular pulse width (e.g., a pulse width that is different than that used to indicate the rotational direction of the magnet wheel), by providing a pulse at a particular current level (e.g., a current level different from that associated with indicating the rotational speed of the magnet wheel), by providing a pulse with a particular pulse width at a particular current level, by refraining from provide an expected pulse (e.g., by refraining from providing a standstill pulse when the magnet wheel is not rotating or is rotating below a threshold speed), and/or the like. Additional details regarding example system error protocols are described below. In this way, a magnetic sensor may detect a system-level error, associated with a sensor system, and provide (e.g., to an ECU), an indication associated with the system-level error using a system error protocol.

As indicated above, FIG. 1 is provided merely as an example. Other examples are possible and may differ from what was described with regard to FIG. 1. Various detailed examples of pulse width modulation techniques, associated with at least two signal levels and at least one signal threshold, are described below.

Figure 2A:
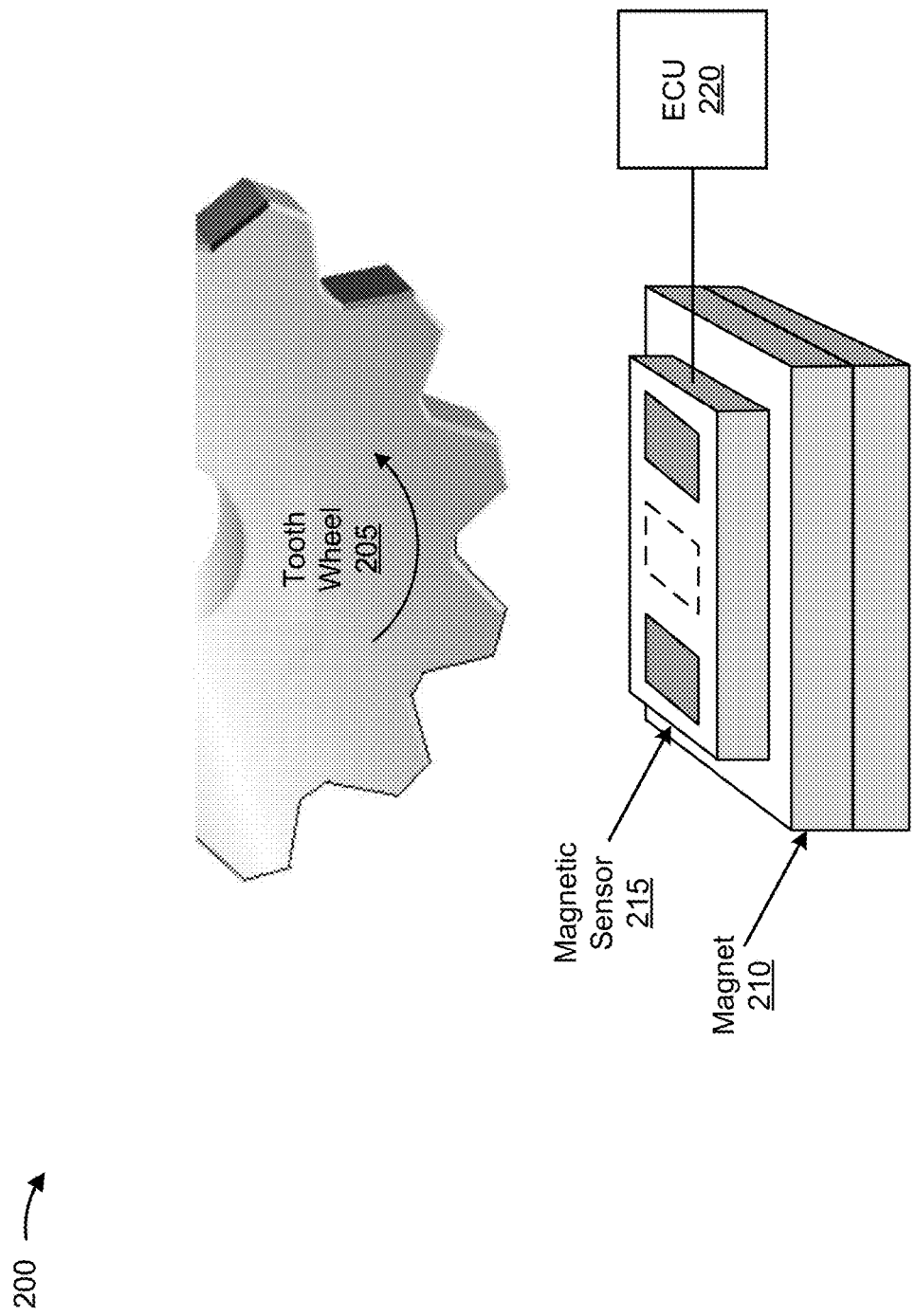
FIGS. 2A and 2B are diagrams of example environments in which systems and/or methods, described herein, may be implemented.
Figure 2B:
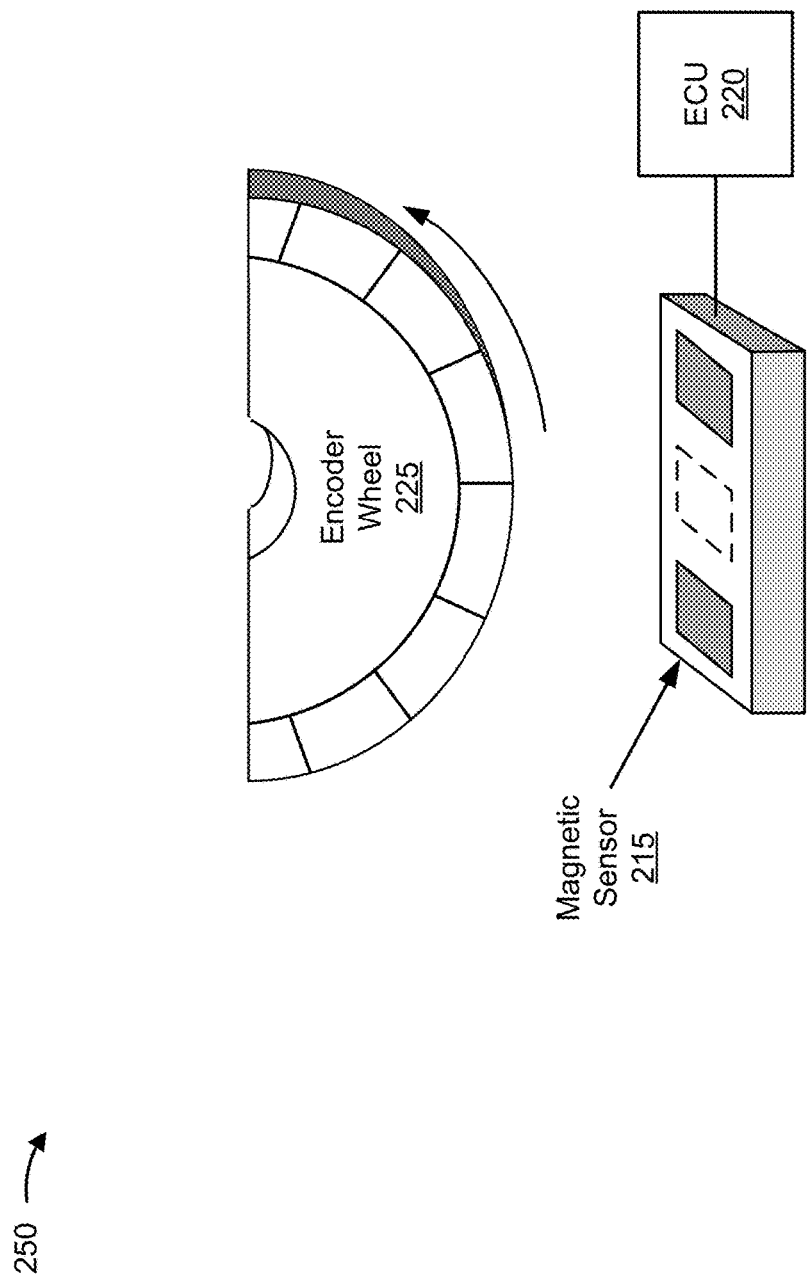

FIGS. 2A and 2B are diagrams of example environments 200 and 250 in which apparatuses described herein may be implemented. As shown in FIG. 2A, environment 200 may include a tooth wheel 205, a magnet 210, a magnetic sensor 215, and an ECU 220.

Tooth wheel 205 includes a wheel comprising a set of teeth. In some implementations, tooth wheel 205 may, during a rotation, distort a magnetic field of a magnet 210 such that magnetic sensor 215 may sense the distorted magnetic field associated with magnet 210. In some implementations, tooth wheel 205 may be comprised of a ferromagnetic material. In some implementations, tooth wheel 205 may be attached to or coupled with an object for which a rotational speed, a rotational direction, and/or an angular position is to be measured, such as a cylindrical structure (e.g., a crankshaft, a camshaft, a rotating cylinder, etc.), a wheel structure (e.g., associated with a tire), an axle (e.g., a vehicle axle), and/or the like.

In some implementations, such as in a crankshaft context, tooth wheel 205 may include a symmetrical tooth wheel, where teeth of tooth wheel 205 have a same width and tooth gaps of tooth wheel 205 have a same width. In some implementations, tooth wheel 205 may include a reference zone (e.g., a comparatively longer tooth or gap) between a pair of teeth of tooth wheel 205. In some implementations, such as in a camshaft context, tooth wheel 205 may include an asymmetrical tooth wheel, where teeth of tooth wheel 205 have varying widths and/or tooth gaps of tooth wheel 205 have varying widths.

Magnet 210 includes a magnet that produces a magnetic field that may be sensed by magnetic sensor 215. In some implementations, magnet 210 may be positioned such that the magnetic field, produced by magnet 210, is distorted by tooth wheel 205. Additionally, or alternatively, magnet 210 may include a back-bias magnet and/or may be positioned near, included in, and/or attached to magnetic sensor 215.

Magnetic sensor 215 includes a housing associated with one or more components (also referred to herein as "sensor components") of a sensor, such as a magnetoresistive (MR) sensor, a Hall-effect sensor, a variable reluctance sensor (VRS), a fluxgate sensor, and/or the like. In some implementations, magnetic sensor 215 may be connected to ECU 220 such that magnetic sensor 215 may transmit information associated with a magnet wheel (e.g., tooth wheel 205, encoder wheel 225) and/or information associated with a sensor system (e.g., a magnetic circuit including tooth wheel 205, magnet 210, and magnetic sensor 215) to ECU 220. The information associated with the magnet wheel may include, for example, information associated with a rotational speed of the magnet wheel, a rotational direction of the magnet wheel, an angular position of the magnet wheel, and/or the like. The information associated with the sensor system may include, for example, information indicating a system-level error detected by magnetic sensor 215. In some implementations, magnetic sensor 215 may provide such information to ECU 220 via one or more transmission interfaces (e.g., a voltage interface, a current interface, etc.) and/or via one or more output terminals. In some implementations, magnetic sensor 215 may include a three-wire sensor (e.g., including one output terminal), a four-wire sensor (e.g., including two output terminals), and/or the like. Additional details regarding magnetic sensor 215 are described below with regard to FIG. 3.

ECU 220 includes one or more circuits associated with determining a rotational speed and/or direction of a magnet wheel (i.e., a rotatable object that is connected to tooth wheel 205 or encoder wheel 225), determining information associated with an error associated with the sensor system, and/or providing such information in association with controlling one or more electrical systems and/or electrical subsystems. In some implementations, ECU 220 may be connected to magnetic sensor 215 such that ECU 220 may receive information (e.g., one or more signals) from magnetic sensor 215 via one or more transmission interfaces and/or via one or more output terminals.

In some implementations, ECU 220 may be capable of calibrating, controlling, adjusting, and/or the like, the one or more electrical systems and/or electrical subsystems based on the information transmitted by magnetic sensor 215. In some implementations, ECU 220 may include an electronic/engine control module (ECM), a powertrain control module (PCM), a transmission control module (TCM), a brake control module (BCM or EBCM), a central control module (CCM), a central timing module (CTM), a general electronic module (GEM), a body control module (BCM), a suspension control module (SCM), and/or the like.

As shown in FIG. 2B, example environment 250 may include magnetic sensor 215, ECU 220, and encoder wheel 225 (e.g., rather than tooth wheel 205 and magnet 210). Encoder wheel 225 includes a magnetic pole wheel with at least two alternating poles, such as a north pole and a south pole. In some implementations, encoder wheel 225 may include a reference zone (e.g., a section with a comparatively longer pole). In some implementations, encoder wheel 225 may produce a magnetic field. In some implementations, encoder wheel 225 may be attached to or coupled with an object for which a rotational speed, a rotational direction, and/or a position is to be measured, such as a cylindrical structure (e.g., a crankshaft, a camshaft, a rotating cylinder, etc.), a wheel structure (e.g., associated with a tire), an axle (e.g., a vehicle axle), and/or the like. In some implementations, encoder wheel 225 and/or tooth wheel 205 may be referred to as a "target wheel."

The number and arrangement of apparatuses shown in FIGS. 2A and 2B are provided as an example. In practice, there may be additional apparatuses, fewer apparatuses, different apparatuses, or differently arranged apparatuses than those shown in FIGS. 2A and 2B. For example, while FIGS. 2A and 2B show particular arrangements of apparatuses in example environments 200 and 250, respectively, in some implementations, magnet 210 and/or magnetic sensor 215 may arranged in a so-called "top read" arrangement, wherein magnet 210 and/or magnetic sensor 215 are positioned above tooth wheel 205/encoder wheel 225 (e.g., rather than below tooth wheel 205/encoder wheel 225 as shown in FIGS. 2A and 2B). Furthermore, two or more apparatuses shown in FIGS. 2A and/or 2B may be implemented within a single apparatus, or a single apparatus shown in FIGS. 2A and/or 2B may be implemented as multiple, distributed apparatuses. Additionally, or alternatively, a set of apparatuses (e.g., one or more apparatuses) of FIGS. 2A and/or 2B may perform one or more functions described as being performed by another set of apparatuses of FIGS. 2A and/or 2B.

Figure 3:
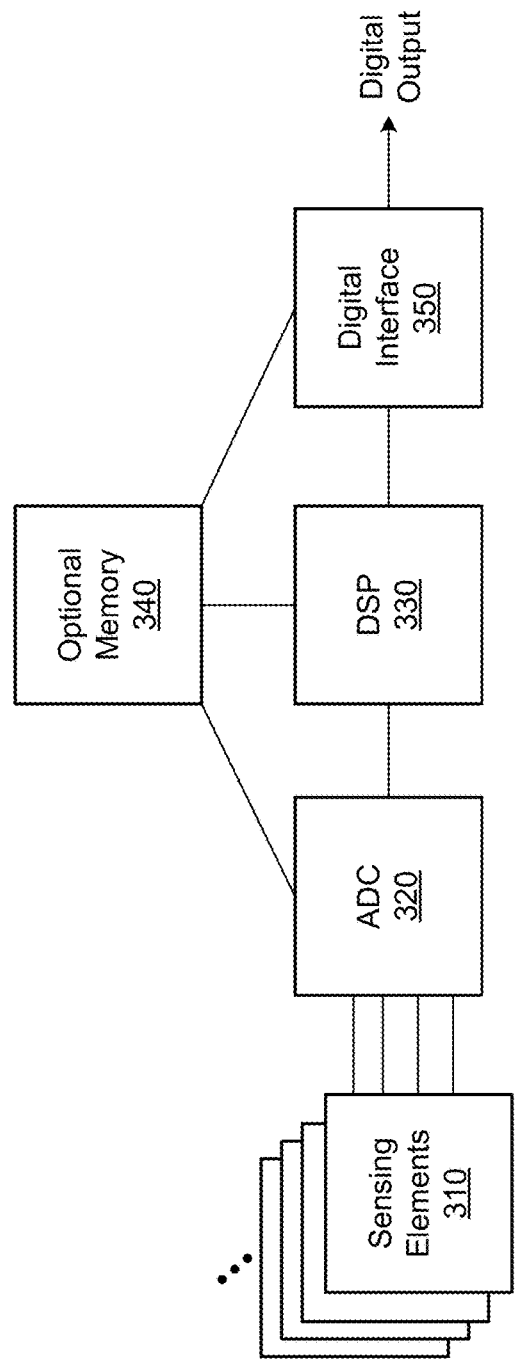
FIG. 3 is a diagram of example elements of a magnetic sensor included in the example environment of FIG. 2A or 2B.

FIG. 3 is a diagram of example elements of magnetic sensor 215 included in example environment 200 of FIG. 2A and/or example environment 250 of FIG. 2B. As shown, magnetic sensor 215 may include at least one sensing element 310, an analog-to-digital convertor (ADC) 320, a digital signal processor (DSP) 330, an optional memory element 340, and a digital interface 350.

Sensing element 310 includes an element for sensing a magnetic field at magnetic sensor 215. For example, sensing element 310 may include a magnetoresistive (MR)-based sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element 310 may operate based on an anisotropic magnetoresistance (AMR) effect, a giant magnetoresistance (GMR) effect, a tunnel magnetoresistance (TMR) effect, and/or the like. As another example, sensing element 310 may include a Hall-based sensing element that operates based on a Hall-effect. As an additional example, sensing element 310 may include a variable reluctance (VR) based sensing element that operates based on induction. In some implementations, sensing element 310 may provide an analog signal, corresponding to the magnetic field, to ADC 320.

ADC 320 includes an analog-to-digital converter that converts an analog signal from the sensing element 310 to a digital signal. For example, ADC 320 may convert analog signals, received from the set of sensing elements 310, into digital signals to be processed by DSP 330. ADC 320 may provide the digital signals to DSP 330. In some implementations, magnetic sensor 215 may include one or more ADCs 320.

DSP 330 includes a digital signal processing device or a collection of digital signal processing devices. In some implementations, DSP 330 may receive digital signals from ADC 320 and may process the digital signals to form signals (e.g., destined for ECU 220 as shown in FIGS. 2A and 2B), such as signals associated with a rotational speed of tooth wheel 205/encoder wheel 225, a rotational direction of tooth wheel 205/encoder wheel 225, and/or information indicating an error associated with the sensor system, as described herein.

Optional memory element 340 includes a read only memory (ROM) (e.g., an EEPROM), a random access memory (RAM), and/or another type of dynamic or static storage device (e.g., a flash memory, a magnetic memory, an optical memory, etc.) that stores information and/or instructions for use by magnetic sensor 215. In some implementations, optional memory element 340 may store information associated with processing performed by DSP 330. Additionally, or alternatively, optional memory element 340 may store configurational values or parameters for the set of sensing elements 310 and/or information for one or more other elements of magnetic sensor 215, such as ADC 320 or digital interface 350.

Digital interface 350 includes an interface via which magnetic sensor 215 may receive and/or provide information from and/or to another device, such as ECU 220 (see FIGS. 2A and 2B). For example, digital interface 350 may provide a signal (i.e., an output signal), determined by DSP 330, to ECU 220 and may further receive information from ECU 220. In some implementations, digital interface 350 permits magnetic sensor 215 to provide one or more signals to ECU 220 using a pulse width modulation technique associated with two current levels and one current threshold, as described elsewhere herein.

The number and arrangement of elements shown in FIG. 3 are provided as an example. In practice, magnetic sensor 215 may include additional elements, fewer elements, different elements, or differently arranged elements than those shown in FIG. 3. Additionally, or alternatively, a set of elements (e.g., one or more elements) of magnetic sensor 215 may perform one or more functions described as being performed by another set of elements of magnetic sensor 215.

Figure 4:
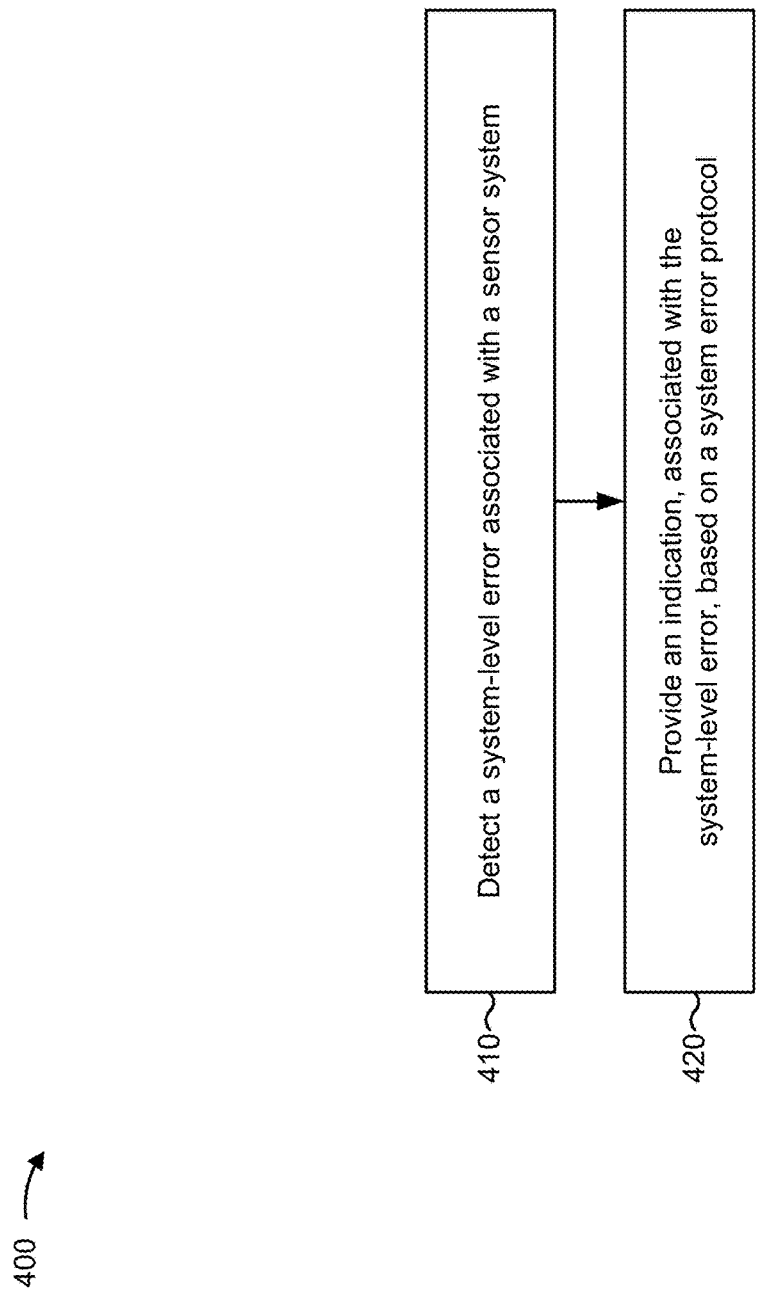
FIG. 4 is a flow chart of an example process for detecting a system-level error, associated with a sensor system, and providing an indication, associated with the system-level error, based on a system error protocol.

FIG. 4 is a flow chart of an example process 400 for detecting a system-level error, associated with a sensor system, and providing an indication, associated with the system-level error, based on a system error protocol. In some implementations, one or more process blocks of FIG. 4 may be performed by magnetic sensor 215.

As shown in FIG. 4, process 400 may include detecting a system-level error associated with a sensor system (block 410). For example, magnetic sensor 215 may detect a system-level error associated with a sensor system.

The system-level error may include an error associated with the sensor system of magnetic sensor 215 (e.g., a magnetic circuit including tooth wheel 205, magnet 210, and magnetic sensor 215 as shown in FIG. 2A; a magnetic circuit including magnetic sensor 215 and encoder wheel 225 as shown in FIG. 2B). For example, the system-level error may include wheel runout of tooth wheel 205/encoder wheel 225 (herein collectively referred to as a magnet wheel), a change in an air gap between magnetic sensor 215 and the magnet wheel, a broken tooth or section of the magnet wheel, poor magnetization of the magnet wheel, and/or the like.

In some implementations, magnetic sensor 215 may detect the system-level error based on a magnetic field sensed by magnetic sensor 215. For example, magnetic sensor 215 may detect the system-level error based on a signal characteristics of a waveform corresponding to the magnetic field present at magnetic sensor 215. In some implementations, the signal characteristic may include, for example, a set of extrema (e.g., a set of maximum and minimum amplitudes) of a waveform corresponding to the magnetic field present at magnetic sensor 215, an offset of the waveform (e.g., relative to a particular value), and/or the like. Examples of detecting such system-level errors based on waveforms corresponding to the magnetic field are described below in association with FIGS. 5A-5D. Notably, while the examples described herein are described in the context of using sets of extrema, associated with a waveform, as the signal characteristics based on which a system-level error may be detected, other implementations are possible. For example, the signal characteristics may include an offset of the waveform or another type of signal characteristic.

As further shown in FIG. 4, process 400 may include providing an indication, associated with the system-level error, based on a system error protocol (block 420). For example, magnetic sensor 215 may provide an indication, associated with the system-level error, based on a system error protocol.

In some implementations, the system error protocol may be implemented in conjunction with a protocol used to provide information associated with the magnet wheel to ECU 220, such as a pulse width modulation (PWM) protocol. According to the PWM protocol, if no rotation of the magnet wheel is detected (e.g., between teeth of tooth wheel 205, during a particular type of pole section of encoder wheel 225, when the magnet wheel is standing still, and/or the like), then magnetic sensor 215 may provide a signal (e.g., a current signal, a voltage signal, and/or the like) at a first level (e.g., 7 milliamps (mA)). During rotation of the magnet wheel (e.g., as a tooth passes magnetic sensor 215, as another type of pole section passes magnetic sensor 215), magnetic sensor 215 may provide a pulse in the output signal at a second level (e.g., 14 mA). In some implementations, the pulse width of the pulse may indicate the direction of rotation of the magnet wheel (e.g., 45 microseconds (µs) for a rotation in a forward direction, 90 µs for a rotation in a backward direction, and/or the like). In some implementations, when magnetic sensor 215 does not detect rotation of the magnet wheel for a threshold amount of time (e.g., when magnetic sensor 215 does not detect a tooth for 100 milliseconds (ms)), then magnetic sensor 215 may provide, to ECU 220, a pulse at the second level with another particular pulse width (e.g., 180 µs).

In some implementations, the system error protocol may operate in conjunction with the PWM protocol. Examples of providing an indication, associated with the system-level error, in conjunction with a PWM protocol are described below in association with FIGS. 6A-6D.

As indicated above, in some implementations, the system error protocol may be used in a current interface configuration. In an example current interface configuration, magnetic sensor 215 includes two pins (e.g., VDD, GND) and modulates a supply current (e.g., at two or more current levels) in order to provide the information associated with the magnet wheel and the indication associated with the system-level error. In such a case, pulse widths of the current may be used to carry the information associated with the magnet wheel and the indication associated with the system-level error.

In some implementations, the system error protocol may be used in a voltage interface configuration. In an example voltage interface configuration, magnetic sensor 215 includes three pins (e.g., VDD, GND, OUT). Here, magnetic sensor 215 is supplied via the VDD pin and the GND pin, and the output signal is a voltage on the OUT pin. In this example, magnetic sensor 215 modulates the output voltage (e.g., at two or more voltage levels) in order to provide the information associated with the magnet wheel and the indication associated with the system-level error. In such a case, pulse widths of the voltage may be used to carry the information associated with the magnet wheel and the indication associated with the system-level error.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5D are graphical representations of example waveforms associated with magnetic sensor detecting a system-level error associated with a sensor system. The example waveforms shown in FIGS. 5A-5D represent example waveforms corresponding to a magnetic field sensed by magnetic sensor 215, during rotation of tooth wheel 205, when the sensor system is or has experienced a system-level error. Notably, while FIGS. 5A-5D are described in the context of a sensor system including tooth wheel 205 and magnet 210, the techniques described in association with FIGS. 5A-5D may also be applicable to a sensor system including encoder wheel 225.

In FIGS. 5A-5D, a positive portion of a waveform (e.g., a portion of a waveform that is above the horizontal axis) corresponds to a tooth of tooth wheel 205 passing magnetic sensor 215, where an extrema (e.g., a peak) in the positive portion (i.e., a maximum) corresponds to a center of the tooth. Similarly, a negative portion of the waveform (e.g., a portion of the waveform that is below the horizontal axis) corresponds to a gap of tooth wheel 205 passing magnetic sensor 215, where an extrema in the negative portion (i.e., a minimum) corresponds to a center of the gap. Thus a negative-to-positive zero crossing at the horizontal axis corresponds to a leading edge of a tooth, and a positive-to-negative zero crossing at the horizontal axis corresponds to a trailing edge of a tooth.

FIG. 5A is a graphical representation of an example waveform based on which magnetic sensor 215 may detect wheel runout associated with a sensor system. As shown in FIG. 5A, when the sensor system is experiencing wheel runout, amplitudes of the extrema (herein collectively referred to as extrema values, and individually as an extrema value) present at magnetic sensor 215 may gradually (e.g., over the course of two or more teeth/gaps) increase and/or decrease. For example, as shown in FIG. 5A, the extrema values may gradually increase during a first portion of the rotation (e.g., a portion of the rotation corresponding to a first set of teeth and gaps), may gradually decrease during a second portion of the rotation (e.g., a portion of the rotation corresponding to a second set of teeth and gaps or pole sections), and may again gradually increase during a third portion of the rotation (e.g., a portion of the rotation corresponding to a third set of teeth and gaps).

In some implementations, magnetic sensor 215 may detect the wheel runout, associated with the sensor system, based on a waveform such as that shown in FIG. 5A. For example, magnetic sensor 215 may be configured to determine, during a rotation of tooth wheel 205, an average extrema value (e.g., based on averaging amplitudes associated with a full rotation of tooth wheel 205). Here, in order to detect the wheel runout, magnetic sensor 215 may compare additional extrema values, detected during another rotation of tooth wheel 205 (e.g., a next rotation), to the average extrema value.

As a particular example, the average extrema value may be represented as a particular value (e.g., 1.00, 100, and/or the like) or a particular percentage (e.g., 100%, and/or the like). Thus, for an ideal sensor system (e.g., a sensor system with no wheel runout) a given extrema value (e.g., corresponding to a given tooth or gap) should match (e.g., within a threshold) the average extrema value during a rotation of tooth wheel 205. Thus, for a sensor system without wheel runout, the extrema values corresponding to a sequence of teeth and gaps may be represented as:

100% 100% 100% 100% 100% 100% 100% 100% 100% . . . .

In other words, in a sensor system without wheel runout, the extrema values of the waveform should be approximately equal to the average extrema value during the rotation of tooth wheel 205.

In some implementations, in order to determine whether wheel runout is present during another (e.g., later) rotation of pole wheel 205, magnetic sensor 215 may compare extrema values, detected during the later rotation, to the average extrema value. For example, in a magnetic circuit where wheel runout is present such that the extrema values of the waveform gradually change (e.g., increase and/or decrease, as shown in FIG. 5A), extrema values corresponding to a sequence of teeth and gaps, when compared to the average extrema value, may be represented as:

100% 110% 120% 130% 130% 120% 110% 100% 100% . . . .

In this example, the extrema values gradually (e.g., 10% between each tooth and gap) increase during a first set of teeth and gaps, and gradually decrease during a second set of teeth and gaps. While not shown, similar gradual increases and decreases may be expected for other teeth and gaps during the rotation of tooth wheel 205. In some implementations, magnetic sensor 215 may detect the wheel runout based on identifying such a gradual increase and/or decrease in the extrema values. In some implementations, magnetic sensor 215 may be configured to detect a gradual increase or decrease when a given extrema value varies from a previous (e.g., immediately preceding) extrema value by a threshold amount (e.g., less than or equal to 10%, 15%, and/or the like). In some implementations, magnetic sensor 215 may detect the wheel runout based on detecting a threshold number of gradual increases (e.g., one or more sequential gradual increases) followed by a threshold number of gradual decreases (e.g., one or more sequential gradual decreases), based on detecting a threshold number of gradual decreases followed by a threshold number of gradual increases, based on detecting a threshold number of gradual increases, based on detecting a threshold number of gradual decreases, and/or the like, during a given rotation of tooth wheel 205.

In other implementations, in order to determine whether wheel runout is present during another (e.g., later) rotation of tooth wheel 205, magnetic sensor 215 may compare offset values, detected during the later rotation, to the average extrema value. For example, in a magnetic circuit where wheel runout is present such that the offset values of the waveform gradually change (e.g., increase and/or decrease, as shown in FIG. 5A), offset values corresponding to a sequence of teeth and gaps, when compared to the average extrema value, may be represented as:

100% 110% 120% 130% 130% 120% 110% 100% 100% . . . .

In this example, magnetic sensor 215 may detect the wheel runout in a similar manner as that described above regarding the extrema values (e.g., such that offset values are compared rather than amplitude values).

In some implementations, magnetic sensor 215 may detect the wheel runout based on both extrema values (e.g., the amplitude values) and offset values.

FIG. 5B is a graphical representation of a first example waveform based on which magnetic sensor 215 may detect an abrupt air gap change associated with the sensor system. As shown in FIG. 5B, when the sensor system experiences an abrupt increase to an air gap between magnetic sensor 215 and tooth wheel 205, the extrema values of the waveform present at magnetic sensor 215 may abruptly decrease (e.g., between a pair of extrema values corresponding to a tooth and a gap). For example, as shown in FIG. 5B, the extrema values may remain approximately constant (e.g., at approximately 100% of the average extrema value) during a first portion of the rotation (e.g., a portion of the rotation corresponding to a first set of teeth and gaps), and may abruptly decrease and remain approximately constant during a second portion of the rotation (e.g., a portion of the rotation corresponding to a second set of teeth and gaps).

In some implementations, magnetic sensor 215 may detect the increased air gap, associated with the sensor system, based on a waveform such as that shown in FIG. 5B. For example, magnetic sensor 215 may determine an average extrema value in a manner similar to that described above. Here, in order to determine whether an abrupt increase in air gap occurs during another (e.g., later) rotation of tooth wheel 205, magnetic sensor 215 may compare extrema values to the average extrema value. For example, in a magnetic circuit where an abrupt increase in air gap occurs such that extrema values of the waveform abruptly decrease (e.g., as shown in FIG. 5B), the extrema values, when compared to the average extrema value, may be represented as:

100% 100% 100% 100% 70% 70% 70% 70% 70% . . . .

In this example, the extrema values of the waveform abruptly decrease (e.g., a reduction of 30% between a particular tooth and gap) as compared to the average extrema value. In some implementations, magnetic sensor 215 may detect the air gap increase based on identifying such an abrupt decrease in the extrema values. In some implementations, magnetic sensor 215 may be configured to detect an air gap increase when the extrema values change by a threshold amount as compared to the average extrema value (e.g., when the extrema values decrease by 30% or more, and/or the like). In some implementations, during a given rotation of tooth wheel 205, magnetic sensor 215 may detect an air gap increase based on detecting such an abrupt decrease followed by a threshold number of extrema values (e.g., two or more) that are approximately equal to the average extrema value, as illustrated in the above example.

FIG. 5C is a graphical representation of a second example waveform based on which magnetic sensor 215 may detect an air gap change associated with the sensor system. As shown in FIG. 5C, when the sensor system experiences a decrease to an air gap between magnetic sensor 215 and tooth wheel 205, the extrema values of the waveform present at magnetic sensor 215 may abruptly increase. For example, as shown in FIG. 5C, the extrema values may remain approximately constant (e.g., at approximately 100% of the average extrema value) during a first portion of the rotation, and may abruptly increase and remain approximately constant during a second portion of the rotation.

In some implementations, magnetic sensor 215 may detect the decreased air gap, associated with the sensor system, based on a waveform such as that shown in FIG. 5C. For example, magnetic sensor 215 may determine an average extrema value in a manner similar to that described above. Here, in order to determine whether an abrupt decrease in air gap occurs during another rotation of tooth wheel 205, magnetic sensor 215 may compare extrema values to the average extrema value. For example, in a magnetic circuit where an abrupt decrease in air gap occurs such that extrema values of the waveform abruptly increase (e.g., as shown in FIG. 5C), the extrema values, when compared to the average extrema value, may be represented as:

100% 100% 100% 100% 130% 130% 130% 130% 130% . . . .

In this example, the extrema values of the waveform abruptly increase (e.g., an increase of 30% between a particular tooth and gap) as compared to the average extrema value. In some implementations, magnetic sensor 215 may detect the air gap decrease based on identifying such an abrupt increase in the extrema values. In some implementations, magnetic sensor 215 may be configured to detect an air gap decrease when the extrema values change by a threshold amount as compared to the average extrema value (e.g., when the extrema values increase by 30% or more, and/or the like). In some implementations, during a given rotation of tooth wheel 205, magnetic sensor 215 may detect an air gap decrease based on detecting such an abrupt increase followed by a threshold number of extrema values (e.g., two or more) that are approximately equal to the average extrema value, as illustrated in the above example.

In a similar manner, magnetic sensor 215 may detect a broken tooth of tooth wheel 205. For example, magnetic sensor 215 may determine an average extrema value in a manner similar to that described above. Here, in order to determine whether tooth wheel 205 has experienced a broken tooth during another (e.g., later) rotation of tooth wheel 205, magnetic sensor 215 may compare the extrema values to the average extrema value. For example, in a magnetic circuit where tooth wheel 205 experiences a broken tooth, an extrema value corresponding to a location of the broken tooth may differ from the average extrema value by 150%, 200%, and/or the like, as compared to the average extrema value. For example, the extrema values, when compared to the average extrema value, may be represented as:

100% 100% 100% 100% 200% 100% 100% 100% 100% . . . .

In this example, the extrema value differing from the average extrema value by 100% (i.e., is 200% of the average extrema value), followed by extrema values that are approximately equal to the average extrema value, indicates that tooth wheel 205 has experienced a broken tooth. In some implementations, magnetic sensor 215 may detect the broken tooth based on identifying such a difference between a single extrema value, while other extrema values are approximately equal to (e.g., within a threshold percentage, such as 1%, 5%, and/or the like) of the average extrema value. In some implementations, magnetic sensor 215 may be configured to detect a broken tooth when the single extrema value differs from the average extrema value by a threshold amount (e.g., is greater than or equal to 150%, 200%, and/or the like).

Figure 5D:
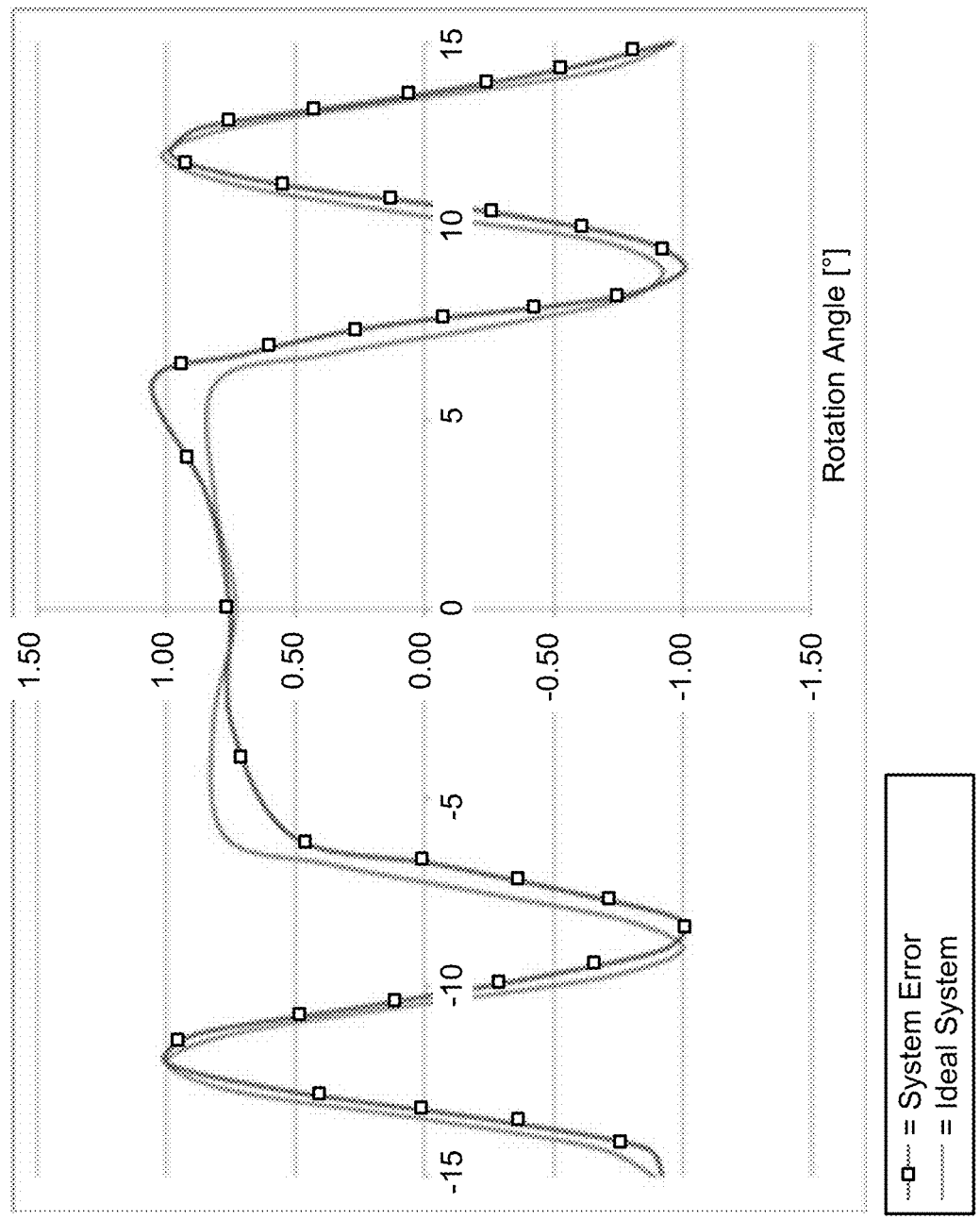

FIG. 5D is a graphical representation of an example waveform based on which magnetic sensor 215 may detect asymmetry of magnet 210 (e.g., a backbias magnet) with a reference zone (e.g., a section with a tooth or gap that is longer than other teeth or gaps of tooth wheel 205, respectively). In FIG. 5D, a portion of a waveform corresponding to the reference zone of magnet 210 in an ideal sensor system (e.g., when magnet 210 is symmetrically magnetized and/or symmetrically positioned with respect to magnetic sensor 215) is identified as the line labeled "Ideal System." A portion of a waveform corresponding to the reference zone of magnet 210 when magnet 210 is asymmetrically magnetized and/or asymmetrically positioned with respect to magnetic sensor 215 is identified as the line labeled "System Error." As shown, when magnet 210 is asymmetrically magnetized and/or asymmetrically positioned, the waveform corresponding to the reference zone may be distorted (e.g., relative to that of the ideal sensor system).

In some implementations, magnetic sensor 215 may detect the asymmetry of magnet 210 based on the waveform in the reference zone. For example, if an extrema in a first portion of the reference zone (e.g., a maximum amplitude in the portion of the reference zone from approximately −8 degrees to approximately 0 degrees) differs from an extrema in a second portion of the reference zone (e.g., a maximum amplitude in the portion of the reference zone from approximately 0 degrees to approximately 8 degrees), differs by a threshold amount (e.g., by 5%, 10%, and/or the like), then magnetic sensor 215 may determine that magnet is asymmetrically magnetized and/or asymmetrically positioned with respect to magnetic sensor 215.

As indicated above, FIGS. 5A-5D are provided merely as examples. Other examples are possible and may differ from what was described with regard to FIGS. 5A-5D.

FIGS. 6A-6D are graphical representations of examples associated with a system error protocol based on which a magnetic sensor may indicate a system-level error associated with a sensor system. Notably, while FIGS. 6A-6D are described in the context of a sensor system including tooth wheel 205 and magnet 210, the techniques described in association with FIGS. 6A-6D may also be applicable to a sensor system including encoder wheel 225.

FIG. 6A is graphical representation of a first example associated with a system error protocol based on which magnetic sensor 215 may provide an indication of a system-level error detected by magnetic sensor 215. In some implementations, as shown in FIG. 6A, magnetic sensor 215 may indicate (e.g., to ECU 220) a system-level error (e.g., wheel runout, an air gap increase or decrease, a broken tooth, asymmetry of magnet 210, and/or the like) based on providing an output signal at a constant current level.

For example, as shown, assume that magnetic sensor 215 is configured to output a signal at a first current level (e.g., 7 mA) and provide pulses at a second current level (e.g., 14 mA) in order to provide information associated with a rotational speed and/or direction of tooth wheel 205. As shown, upon detecting the system-level error, magnetic sensor 215 may provide the output signal at a third current level (e.g., 3.5 mA) in order to indicate that magnetic sensor 215 has detected the system-level error. In this example, upon detecting that the output signal is at the third current level, ECU 220 may request additional information (e.g., information that identifies the type of system-level error) from magnetic sensor 215. Alternatively, in some cases, magnetic sensor 215 may hold the output signal at the second current level in order to indicate the system-level error.

In some implementations, the current level at which the signal is held by magnetic sensor 215 may correspond to the type of system-level error detected by magnetic sensor 215. For example, if magnetic sensor 215 detects a first type system-level error (e.g., wheel runout), then magnetic sensor 215 may provide the output signal at the third current level. Conversely, if magnetic sensor 215 detects a second type of system-level error (e.g., an air gap increase), then magnetic sensor 215 may provide the output signal at the second current level.

As another example, if magnetic sensor 215 detects a first type of system-level error, then magnetic sensor 215 may provide the output signal at the third current level. Further, if magnetic sensor 215 detects a second type of system-level error, then magnetic sensor 215 may provide the output signal at a fourth current level. Finally, if magnetic sensor 215 detects a third type of system-level error, then magnetic sensor 215 may provide the output signal at a fifth current level. In other words, the current level at which magnetic sensor 215 holds the output signal may be used to indicate, to ECU 220, the type of system-level error, thereby eliminating a need for ECU 220 to query magnetic sensor 215 regarding the type of system-level error, which conserves processing and communication resources of ECU 220 and/or magnetic sensor 215.

In some implementations, the current level at which the signal is held by magnetic sensor 215 may correspond to a combination of two or more system-level errors (e.g., when magnetic sensor 215 has detected two or more system-level errors to be reported to ECU 220).

Figure 6B:
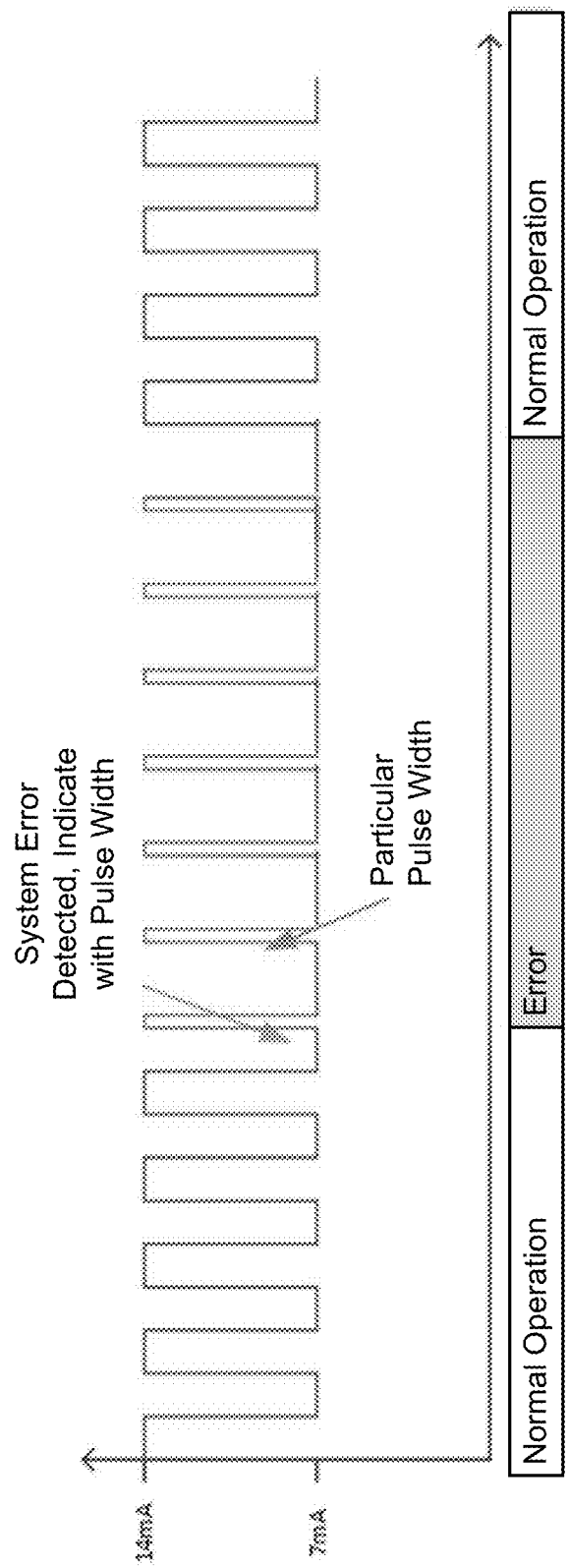

FIG. 6B is graphical representation of a second example associated with a system error protocol based on which magnetic sensor 215 may provide an indication of a system-level error detected by magnetic sensor 215. In some implementations, as shown in FIG. 6B, magnetic sensor 215 may indicate (e.g., to ECU 220) a system-level error based on providing a pulse with a particular pulse width.

For example, as shown, assume that magnetic sensor 215 is configured to output a signal at a first current level (e.g., 7 mA) and provide pulses with particular pulse widths (e.g., 45 µs or 90 µs) at a second current level (e.g., 14 mA) in order to provide information associated with a rotational speed and/or direction of tooth wheel 205. As shown, upon detecting the system-level error, magnetic sensor 215 may provide the output signal at the second current level, with another pulse width (e.g., 15 µs) in order to indicate that magnetic sensor 215 has detected the system-level error. In this example, upon detecting the other pulse width at the second current level, ECU 220 may request additional information (e.g., information that identifies the type of system-level error) from magnetic sensor 215.

In some implementations, the pulse width of the pulse provided by magnetic sensor 215 may correspond to the type of system-level error detected by magnetic sensor 215. For example, if magnetic sensor 215 detects a first type of system-level error (e.g., wheel runout), then magnetic sensor 215 may provide a pulse with a first pulse width (e.g., 180 µs). Conversely, if magnetic sensor 215 detects a second type of system-level error (e.g., an air gap increase), then magnetic sensor 215 may provide a pulse with a second pulse width (e.g., 30 µs). In other words, the pulse width of the pulse provided by magnetic sensor 215 may be used to indicate, to ECU 220, the type of system-level error, thereby eliminating a need for ECU 220 to query magnetic sensor 215 regarding the type of system-level error, which conserves processing and communication resources of ECU 220 and/or magnetic sensor 215. Further, in the example shown in FIG. 6B, information indicating the rotational speed of tooth wheel 205 is provided concurrently with magnetic sensor 215 indicating the system-level error.

In some implementations, magnetic sensor 215 may provide one or more pulses upon detecting the system-level error (e.g., seven are shown in FIG. 6B). In some implementations, after providing the one or more pulses, magnetic sensor 215 may return to normal operation, as shown in FIG. 6B. In some implementations, the number of pulses may be used to indicate the type of system-level error detected by magnetic sensor 215 (e.g., a first number of pulses may indicate a first type of system-level error, a second number of pulses may indicate second type of system-level error, and/or the like).

In some implementations, the pulse width and/or the number of pulses provided by magnetic sensor 215 may correspond to a combination of two or more system-level errors (e.g., when magnetic sensor 215 has detected two or more system-level errors to be reported to ECU 220).

Figure 6C:
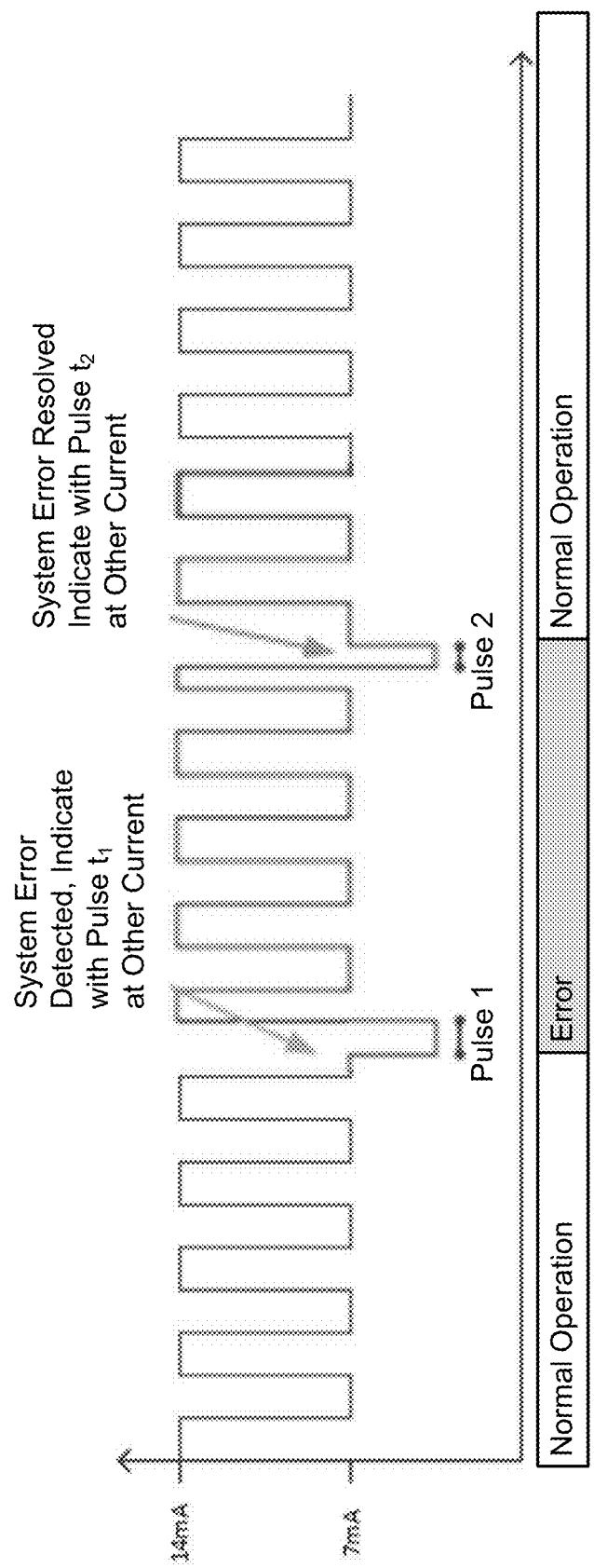

FIG. 6C is a graphical representation of a third example associated with a system error protocol based on which magnetic sensor 215 may provide an indication of a system-level error detected by magnetic sensor 215. In some implementations, as shown in FIG. 6C, magnetic sensor 215 may indicate (e.g., to ECU 220) a system-level error based on providing a pulse with a particular pulse width at a particular current level.

For example, as shown, assume that magnetic sensor 215 is configured to output a signal at a first current level (e.g., 7 mA) and provide pulses with particular pulse widths (e.g., 45 µs or 90 µs) at a second current level (e.g., 14 mA) in order to provide information associated with a rotational speed and/or direction of tooth wheel 205. As shown, upon detecting the system-level error, magnetic sensor 215 may provide the output signal at a third current level (e.g., 3.5 mA) with another pulse width (e.g., 30 µs) in order to indicate that magnetic sensor 215 has detected the system-level error. In this example, upon detecting the other pulse width at the third current level, ECU 220 may request additional information (e.g., information that identifies the type of system-level error) from magnetic sensor 215.

In some implementations, the current level and/or the pulse width of the pulse provided by magnetic sensor 215 may correspond to the type of system-level error detected by magnetic sensor 215. For example, if magnetic sensor 215 detects a first type system-level error (e.g., wheel runout), then magnetic sensor 215 may provide a pulse with a first pulse width (e.g., 45 µs) at the third current level. Conversely, if magnetic sensor 215 detects a second type of system-level error (e.g., an air gap increase), then magnetic sensor 215 may provide a pulse with a second pulse width (e.g., 15 µs) at the second current level. In other words, the pulse width and the current level of the pulse provided by magnetic sensor 215 may be used to indicate, to ECU 220, the type of system-level error, thereby eliminating a need for ECU 220 to query magnetic sensor 215 regarding the type of system-level error, which conserves processing and communication resources of ECU 220 and/or magnetic sensor 215. Further, in the example shown in FIG. 6C, information indicating the rotational speed of tooth wheel 205 is provided concurrently with magnetic sensor 215 indicating the system-level error. In some implementations, magnetic sensor 215 may provide one or more pulses upon detecting the system-level error.

In some implementations, as shown in FIG. 6C, magnetic sensor 215 may provide a pulse (e.g., with another particular pulse width at the second current level) based on determining that the system-level error has disappeared from the waveform, and may return to normal operation thereafter.

In some implementations, the pulse width and/or the current level of pulses provided by magnetic sensor 215 may correspond to a combination of two or more system-level errors (e.g., when magnetic sensor 215 has detected two or more system-level errors to be reported to ECU 220).

Figure 6D:
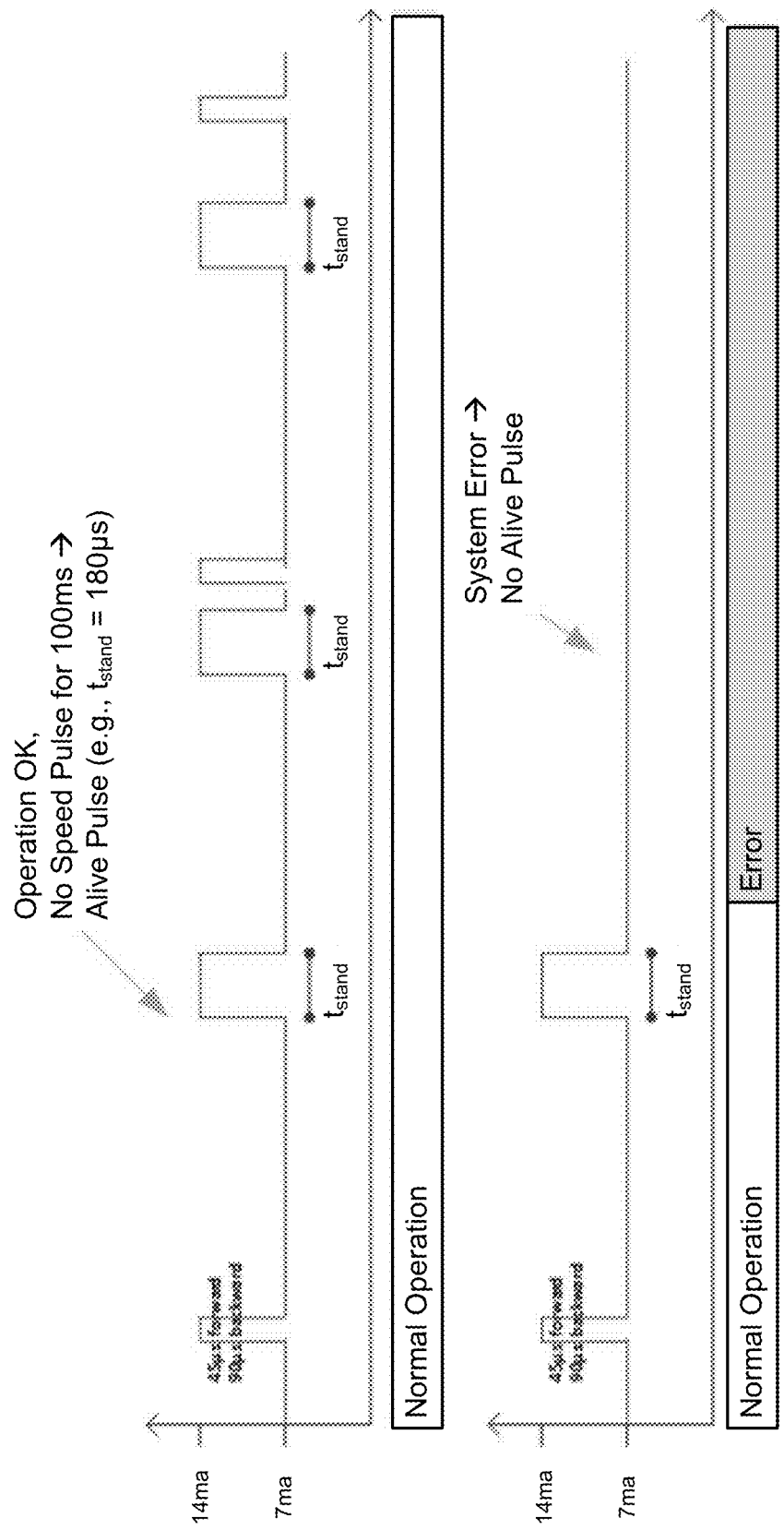

FIG. 6D is graphical representation of a fourth example associated with a system error protocol based on which magnetic sensor 215 may provide an indication of a system-level error detected by magnetic sensor 215. In some implementations, as shown in FIG. 6D, magnetic sensor 215 may indicate (e.g., to ECU 220) a system-level error based on refraining from providing a standstill pulse (e.g., when tooth wheel 205 is not rotating or is rotating below a threshold speed).

For example, as shown, assume that magnetic sensor 215 is configured to output a signal at a first current level (e.g., 7 mA) and provide pulses with particular pulse widths (e.g., 45 µs or 90 µs) at a second current level (e.g., 14 mA) in order to provide information associated with a rotational speed and/or direction of tooth wheel 205. Further, assume that when magnetic sensor 215 does not detect a tooth for a threshold amount of time (e.g., 100 ms), indicating that tooth wheel 205 is at a standstill or is rotating below a threshold speed, then magnetic sensor 215 is configured to provide a standstill pulse with a particular pulse width (e.g., 180 µs). As shown, upon detecting the system-level error, magnetic sensor 215 may provide the output signal at the first current level, while refraining from providing the standstill pulse, in order to indicate that magnetic sensor 215 has detected the system-level error. In this example, upon failing to detect a pulse (e.g., of any pulse width) after a threshold amount of time (e.g., 100 ms), ECU 220 may request additional information (e.g., information that identifies the type of system-level error) from magnetic sensor 215.

As indicated above, FIGS. 6A-6D are provided merely as examples. Other examples are possible and may differ from what was described with regard to FIGS. 6A-6D. For example, a number and/or a spacing of signal levels, pulse widths, and/or the like, based on which information is encoded in the signal, are provided merely as examples, and other examples are possible than those described in connection with FIGS. 6A-6D.

Some implementations described herein provide a magnetic sensor capable of detecting a system-level error, associated with a sensor system, and providing (e.g., to an ECU), an indication associated with the system-level error using a system error protocol.

The foregoing disclosure provides illustration and description, but is not intended to be exhaustive or to limit the implementations to the precise form disclosed. Modifications and variations are possible in light of the above disclosure or may be acquired from practice of the implementations. For example, while the techniques described herein are described in the context of detecting and indicting system-level errors during operation of magnetic sensor 215 in a sensor system, these techniques may also be applied in another context, such as during evaluation and/or testing of the sensor system as part of a production and/or assembly process, during startup of magnetic sensor 215 (e.g., where magnetic sensor 215 stores reference information based on which to compare signal values), and/or the like.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A magnetic sensor, comprising:
   one or more sensor components to:
      determine whether a distortion at a positive portion of a waveform or at a negative portion of the waveform satisfies a threshold asymmetry,
         the positive portion of the waveform corresponding to a particular tooth of a target wheel,
         the negative portion of the waveform corresponding to a particular gap of the target wheel, and
         the waveform corresponding to a magnetic field present at the magnetic sensor;
      detect a system-level error, associated with a sensor system that includes the magnetic sensor, based on the distortion satisfying the threshold asymmetry; and
      provide an indication of the system-level error in an output signal.

2. The magnetic sensor of claim 1, wherein the output signal carries information associated with a rotational speed or a rotational direction of the target wheel.

3. The magnetic sensor of claim 1, where the system-level error is a first system-level error; and
   where the one or more sensor components are further to:
      detect, based on a set of signal characteristics of the waveform, a second system-level error including at least one of:
         an imperfection of the target wheel;
         runout of the target wheel;
         a change to an air gap between the magnetic sensor and the target wheel; or
         a broken tooth of the target wheel.

4. The magnetic sensor of claim 1, where the one or more sensor components are further to:
   detect a gradual increase or a gradual decrease among signal characteristics; of the waveform; and
   where the one or more sensor components, when detecting the system-level error, are to:
      detect the system-level error based on the gradual increase or the gradual decrease among the signal characteristics.

5. The magnetic sensor of claim 1, where the one or more sensor components are further to:
   detect an increase or decrease between a pair of signal characteristics of the waveform; and
   where the one or more sensor components, when detecting the system-level error, are to:
      detect the system-level error based on the increase or decrease between the pair of signal characteristics.

6. The magnetic sensor of claim 1, where the one or more sensor components are further to:
   detect an increase or decrease associated with a single signal characteristic; of the waveform; and where the one or more sensor components, when detecting the system-level error, are to:
  detect the system-level error based on the increase associated with the single signal characteristic.

7. The magnetic sensor of claim 1, where at least one of the positive portion of the waveform or the negative portion of the waveform corresponds to a reference zone of the target wheel.

8. The magnetic sensor of claim 1, where at least one of the positive portion of the waveform or the negative portion of the waveform includes at least one of:
  an extrema value associated with the waveform,
  an offset associated with the waveform,
  an average value of two or more extrema values, or
  an average value of two or more offset values.

9. A sensor, comprising:
  one or more sensor components to:
    determine, based on a magnetic field present at the sensor, one or more signal characteristics of a waveform corresponding to the magnetic field;
    determine, based on the one or more signal characteristics, whether a distortion at a positive portion of the waveform or at a negative portion of the waveform satisfies a threshold asymmetry,
      the positive portion of the waveform corresponding to a particular tooth of a target wheel, and
      the negative portion of the waveform corresponding to a particular gap of the target wheel;
    detect, based on the distortion satisfying the threshold asymmetry, a system-level error associated with a magnetic circuit that includes the sensor; and
    provide an indication associated with the system-level error in an output signal,
      the output signal being associated with carrying information indicating a rotational speed or a rotational direction of a wheel included in the magnetic circuit.

10. The sensor of claim 9, where the one or more sensor components, when providing the indication associated with the system-level error, are to:
  provide the indication by holding the output signal at a particular signal level.

11. The sensor of claim 10, where the particular signal level at which the sensor holds the output signal indicates a type of the system-level error.

12. The sensor of claim 9, where the one or more sensor components, when providing the indication associated with the system-level error, are to:
  provide the indication using a pulse in the output signal, where the pulse has a particular pulse width and is provided at a particular signal level.

13. The sensor of claim 12, where the particular signal level is associated with indicating the rotational speed or the rotational direction of the wheel, and the particular pulse width indicates the system-level error.

14. The sensor of claim 12, where the particular pulse width indicates a type of the system-level error.

15. The sensor of claim 12, where the particular pulse width and the particular signal level indicate a type of the system-level error.

16. The sensor of claim 9, where the one or more sensor components, when providing the indication associated with the system-level error, are to:
  provide the indication by refraining to send a standstill pulse associated with the wheel.

17. A method, comprising:
  determining, by a sensor, whether a distortion at a positive portion of a waveform or at a negative portion of the waveform satisfies a threshold asymmetry,
    the positive portion of the waveform corresponding to a particular tooth of a target wheel,
    the negative portion of the waveform corresponding to a particular gap of the target wheel, and
    the waveform corresponding to a magnetic field present at the sensor;
  detecting, by the sensor and based on the distortion satisfying the threshold asymmetry, a system-level error associated with a sensor system; and
  providing, by the sensor, an indication of the system-level error in an output signal used to carry information associated with the target wheel.

18. The method of claim 17, further comprising:
  determining, based on the waveform, an average signal characteristic value associated with a rotation of the target wheel; and
  where detecting the system-level error comprises:
    detecting the system-level error based on the average signal characteristic value.

19. The method of claim 17, where detecting the system-level error comprises at least one of:
  detecting the system-level error based on a gradual change among signal characteristics, of the waveform;
  detecting the system-level error based on an abrupt increase or an abrupt decrease between a pair of signal characteristics of the waveform; or
  detecting the system-level error based on an increase associated with a single signal characteristic, of the waveform.

20. The method of claim 17, where providing the indication of the system-level error comprises:
  providing the indication by holding the output signal at a particular signal level;
  providing the indication using at least one pulse in the output signal; or
  providing the indication by refraining to send a standstill pulse associated with the target wheel.

* * * * *